United States Patent [19]
Cirino et al.

[11] Patent Number: 6,164,604
[45] Date of Patent: Dec. 26, 2000

[54] PIPE CLAMPS

[75] Inventors: Catherine Cirino, San Juan, Puerto Rico; Roberto Rodriguez, Brunswick; Susan Geary, Parma, both of Ohio

[73] Assignee: Oatey Co., Cleveland, Ohio

[21] Appl. No.: 09/017,747

[22] Filed: Feb. 3, 1998

[51] Int. Cl.[7] .................................................. F16L 3/08
[52] U.S. Cl. ............................................................ 248/74.3
[58] Field of Search ............................. 248/71, 74.1, 65, 248/316.5, 74.3, 74.2

[56] References Cited

U.S. PATENT DOCUMENTS

| | | | |
|---|---|---|---|
| 2,396,837 | 3/1946 | Ellinwood | 174/40 |
| 3,606,218 | 9/1971 | Enlund et al. | 248/74.2 |
| 3,684,220 | 8/1972 | Logsdon . | |
| 3,684,223 | 8/1972 | Logsdon . | |
| 3,913,187 | 10/1975 | Okuda | 248/74.3 |
| 4,260,123 | 4/1981 | Ismert . | |
| 4,442,994 | 4/1984 | Logsdon . | |
| 4,775,121 | 10/1988 | Carty | 248/316.5 |
| 4,783,029 | 11/1988 | Geppert et al. | 248/74.1 |
| 4,784,358 | 11/1988 | Kohut | 248/74.3 |
| 4,903,921 | 2/1990 | Logsdon | 248/74.1 |
| 4,930,733 | 6/1990 | Logsdon | 248/74.2 |
| 5,020,749 | 6/1991 | Kraus | 248/74.3 |
| 5,054,741 | 10/1991 | Ismert | 248/74.5 |
| 5,230,488 | 7/1993 | Condon | 248/74.1 |
| 5,277,387 | 1/1994 | Lewis et al. | 248/71 |
| 5,305,978 | 4/1994 | Current | 248/74.3 |
| 5,344,112 | 9/1994 | Peterson et al. | 248/74.3 |
| 5,613,655 | 3/1997 | Marion | 248/74.3 |
| 5,647,563 | 7/1997 | Gantner et al. | 248/74.1 |
| 5,820,048 | 10/1998 | Shereyk et al. | 248/71 |

*Primary Examiner*—Ramon O. Ramirez
*Attorney, Agent, or Firm*—Renner, Otto, Boisselle & Sklar, LLP

[57] ABSTRACT

A full or half clamp for supporting a pipe from a mounting surface includes a plastic body portion having an arcuate recess with an arcuate length in excess of 180° and opposite ends that are relatively thin and flexible to facilitate snap fitting of a pipe into the recess. A pivotable arm is integrally connected to the body portion of the full clamp by a hinge formed by a notch in an outer wall of the body portion. The arm includes an arcuate recess forming a continuation of the recess in the body portion when the arm is moved into engagement with the body portion. A plurality of circumferentially spaced, longitudinally extending plastic projections are provided on the inner wall of the recesses in both the body portion and arm for gripping the exterior surface of the pipe. One of the projections is located on the arm immediately adjacent the hinge to provide a well defined hinge line for the arm. The half clamp is desirably substantially identical in shape to the main body portion of the full clamp except that the hinge of the full clamp is eliminated from the half clamp, and the projection on the arm that is immediately adjacent the hinge of the full clamp is incorporated as part of the half clamp. This has the advantage that the same mold that is used to mold the full clamp can also be used to mold the half clamp simply by removing an insert that is used to form the hinge in the full clamp and by placing another insert in the mold to eliminate the portion of the arm beyond the projection immediately adjacent the hinge.

13 Claims, 1 Drawing Sheet

PIPE CLAMPS

FIELD OF THE INVENTION

This invention relates generally to pipe clamps or hangers for securely gripping and attaching pipes of various types to support surfaces.

BACKGROUND OF THE INVENTION

It is common in the plumbing industry to use plastic pipe clamps or hangers to mount pipes to both horizontal and vertical support surfaces. Both full clamps and half clamps have been utilized either to fully or partially encircle the pipes prior to attaching the clamps to mounting surfaces using suitable fasteners such as nails that are driven through passageways in the clamps and into the mounting surfaces. Such clamps typically include a plurality of circumferentially spaced integral plastic ribs or projections on the inner walls of the clamps that compressibly grip the exterior surface of the pipes.

The full clamps typically include two clamp halves that are hinged together on one side to allow the clamp halves to be opened up for encircling the pipe and then closed around the pipe prior to attaching the clamps to a support surface. An objection to these clamps is that the hinge is typically formed by providing a notch or groove on the inner surface of the clamps which precludes any of the gripping projections from being located immediately adjacent the hinge for gripping the exterior surface of the pipe immediately adjacent the hinge.

Still another objection to these types of full clamps is that the relative closeness of the free ends of the two clamp halves when the clamps are in the relaxed condition (prior to being installed around a pipe) makes it more difficult to load the clamps onto a track or rail for transporting the clamps to a machine for the automated insertion of fasteners into one of the clamp halves and also makes it more difficult to spread the clamp halves apart when placing the clamps around a pipe.

A further objection to known types of full and half clamps is that one or both ends of the half clamps or the main clamp halves of full clamps are relatively thick and rigid, which severely restricts the amount of flexibility of the half clamps or main clamp halves of the full clamps and thus the amount that the half clamps or main clamp halves of the full clamps can extend around the pipe. The greater such extension the less likely the pipe clamp mountings will become loosened around the pipe.

Moreover, a further objection to known types of full and half clamps is that separate molds are typically required to make both types of clamps, which greatly adds to the cost of manufacture of both types of clamps.

SUMMARY OF THE INVENTION

The present invention relates to certain improvements in both full and half clamps that substantially eliminate the various objections outlined above.

In accordance with one aspect of the invention, both ends of the half clamp and one of the clamp halves of the full clamp are relatively thin and flexible, thus permitting the half clamp and one of the full clamp halves to extend substantially more than 180° around the pipe to provide a more secure snap fit of the clamps around the pipe.

In accordance with another aspect of the invention, the hinge for the full clamp is formed by providing a notch or groove in the exterior surface of the clamp, whereby one of the gripping projections may be located on the inner surface of the clamp immediately adjacent the hinge to grip the exterior surface of the pipe immediately adjacent the hinge.

In accordance with another aspect of the invention, the full clamp half and the half clamp that extends substantially more than 180° around the exterior surface of the pipe have projections adjacent both ends thereof to provide a more secure snap fit of the clamps around the pipe.

In accordance with another aspect of the invention, the full clamps are molded such that when the clamps are in the fully relaxed condition, an angularly shaped opening is provided between the two clamp halves to facilitate loading of the full clamps onto a track or rail for transporting the clamps to a machine that automatically inserts a suitable fastener such as a nail into one of the clamp halves. Also, the angular relationship between the two clamp halves at the opening facilitates spreading of the two clamp halves apart during placement of the full clamp around a pipe.

In accordance with another aspect of the invention, one of the full clamp halves and the half clamp have enlarged flat surfaces that engage a substantially flat surface on the other clamp half, in the case of the full clamp, or the mounting surface in the case of the half clamp, to give such clamps greater stability when installed.

In accordance with another aspect of the invention, the same mold that is used to mold the full clamp can, with slight modification, also be used to mold the half clamp, which greatly reduces the cost of manufacture of both clamps.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE PREFERRED EMBODIMENTS

Figure 1:
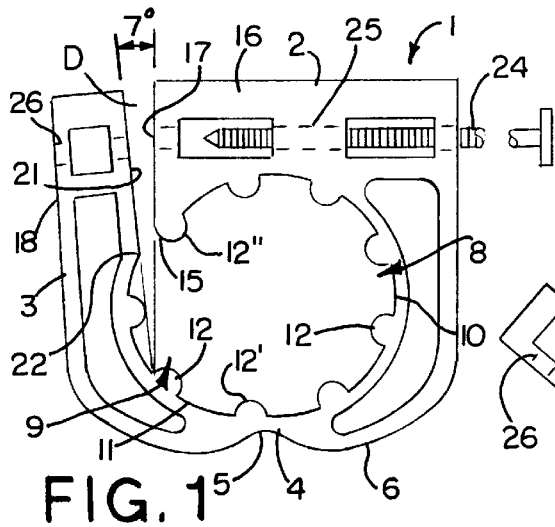
FIG. 1 is a side elevation view of a preferred form of full pipe clamp in accordance with this invention shown in the fully relaxed condition with an angled opening between the free ends of the two clamp halves to facilitate loading of the clamps onto a track or rail for transporting of the clamps to a machine for automatically inserting fasteners into one of the clamp halves and to facilitate spreading apart of the two clamp halves when placed around a pipe.

Referring now in detail to the drawings, and initially to FIG. 1, there is shown a preferred form of full clamp 1 in accordance with this invention including a main body portion 2 and pivotable arm 3 made out of a suitable thermoplastic material such as polyethylene. The arm 3 is pivotably connected to the main body portion 2 by an integral hinge 4 formed by providing a recess or groove 5 in the outer wall 6 of the clamp at the hinge line. This allows the arm 3 to be pivoted away and toward the main body portion 2 for opening and closing the clamp around a pipe 7 to be supported thereby as described hereafter.

Figure 4:
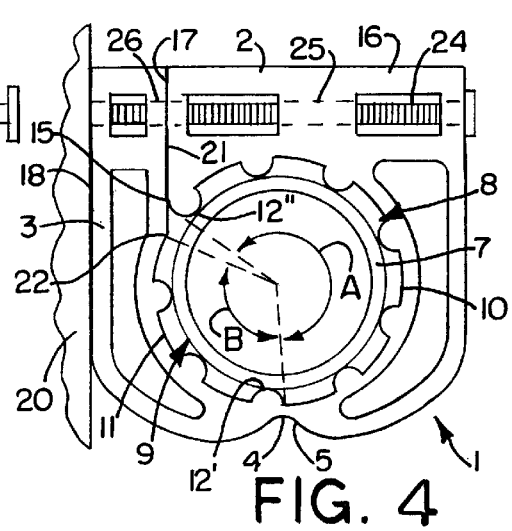
FIG. 4 is a side elevation view of the full clamp similar to FIG. 3 but showing the two clamp halves fully closed around the pipe and the clamp suitably fastened to a support surface.

The main body portion 2 has an arcuate recess 8 extending over an arcuate length A of approximately 230 degrees, whereas the arm 3 has an arcuate recess 9 extending over an arcuate length B of approximately 116 degrees, and forms a continuation of the arcuate length of the an semicylindrical recess 8 of the main body portion when the clamp is fully closed as schematically illustrated in FIG. 4. Integrally formed on the arcuate inner walls 10 and 11 of the arcuate recesses 8 and 9 of the two clamp halves 2 and 3 are a plurality of circumferentially spaced, longitudinally extending rounded plastic ribs or projections 12 that compressibly grip the exterior surface of the pipe 7 when the pipe is received within the clamp.

In the preferred embodiment disclosed herein, the ribs or projections 12 are each spaced approximately 40° apart around the entire inner periphery of the clamp. Also, one of the ribs or projections 12' on the arm 3 is located immediately adjacent the hinge 4 to provide a well defined hinge line/flexure point for the pivotable arm, and cooperates with another rib or projection 12" at the bottom innermost end 15 of the inner wall 10 of the main body portion 2 to assist in retaining the pipe 7 within the semicylindrical recess 8 in the main body portion.

Figure 2:
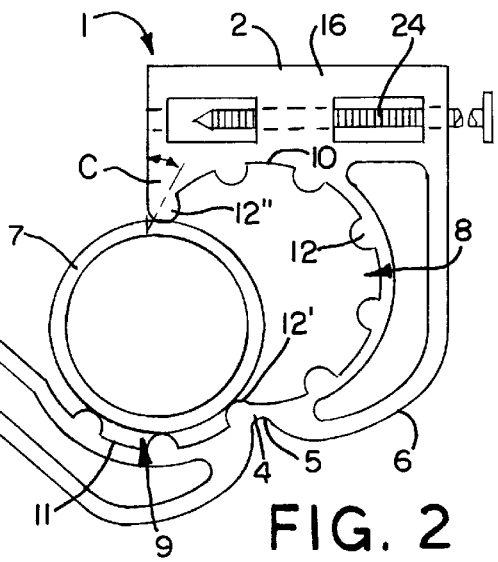
FIG. 2 is a side elevation view of the full clamp of FIG. 1 but showing the two clamp halves spread further apart and a pipe partially received within the clamp.

The main body portion 2 opposite the hinge 4 includes an upstanding side 16 terminating in a flat bottom 17 that intersects the arcuate inner wall 10 of the main body portion at an acute angle C of approximately 26 degrees or less as schematically shown in FIG. 2 to increase the surface area of the flat bottom 17 and provide a tapered inner end 15 giving greater flexibility to the inner end thus allowing the main body portion to be more easily snap fitted over the pipe.

The pivotable arm 3 also includes a flat bottom 18 that extends substantially the full length of the arm to provide a relatively large surface area for supporting the full clamp 1 against a horizontal or vertical support mounting surface 20, schematically shown in FIG. 4. Also, the top surface 21 of the arm 3 is flat and parallel to the bottom surface 18 and intersects the arcuate inner wall 11 of the arm 3 at a point 22 inwardly of the innermost edge 15 of the bottom surface 17 of the main body portion 2 to provide for full mating contact between the bottom surface 17 of the main body portion and top surface 21 of the pivotable arm when the clamp is completely closed around a pipe to give the clamp 1 greater stability when installed.

Figure 3:
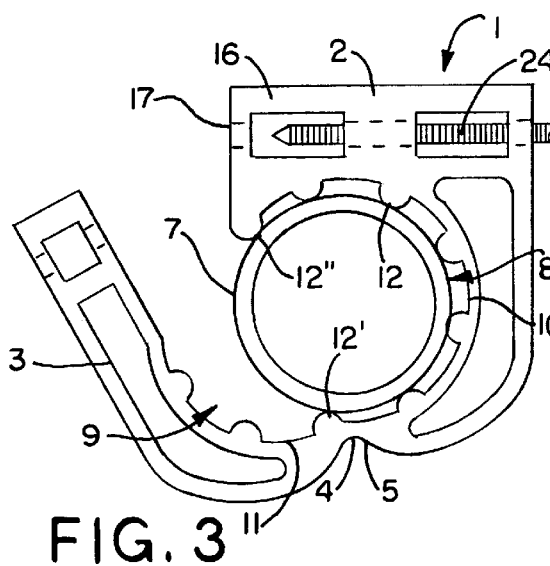
FIG. 3 is a side elevation view of the full clamp of FIG. 1 but showing the pipe snap fitted into the main clamp half and the two clamp halves still spread part way apart.

Preferably the full clamp 1 is molded so that when the clamp is in the fully relaxed condition shown in FIG. 1, an opening D of approximately 7° is provided between the top surface 21 of the pivotable arm 3 and the adjacent bottom surface 17 of the main body portion 2. This facilitates loading of the full clamps 1 onto a track or rail for transporting the clamps to a machine where suitable fasteners such as barbed shank nails 24 are automatically inserted part way into the upper ends of holes 25 extending through the upstanding side 16 of the main body portion 2 of the full clamps as schematically shown in FIGS. 1 through 3. Also, providing a tapered opening D between the two clamp halves 2 and 3 of the full clamp facilitates wedging of the two clamp halves apart when the opening D is pressed against the side of a pipe to be clamped thereby.

FIG. 2 shows the arm 3 pivoted away from the main body portion 2 and the pipe 7 inserted part way into the clamp 1 into engagement with the rounded ribs 12' and 12", whereas FIG. 3 shows the pipe snap fitted into the recess 8 in the main body portion 2 with all of the ribs 12", 12 on the main body portion 2 and the rib 12' on the pivotable arm 3 immediately adjacent the hinge 4 compressibly gripping the exterior surface of the pipe. Also, FIG. 3 shows the two clamp halves 2 and 3 still spread part way apart, whereas FIG. 4 shows the two clamp halves fully closed around the pipe with the flat bottom and top 17 and 21 of the main body portion 2 and arm 3 in abutting engagement with each other. In addition FIG. 4 shows the flat bottom surface 18 of the arm 3 pressed tight up against the mounting surface 20 and the fastener 24 driven through a hole 26 in the arm 3 in alignment with the hole 25 in the main body portion 2 and into the mounting surface 20 for securely attaching the clamp 1 and thus the pipe to the mounting surface.

Figure 5:
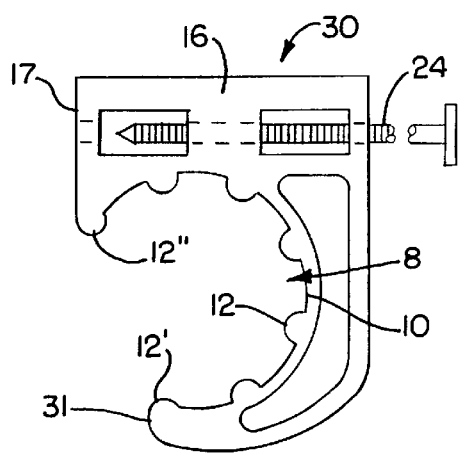
FIG. 5 is a side elevation view of a preferred form of half clamp in accordance with this invention.
Figure 6:
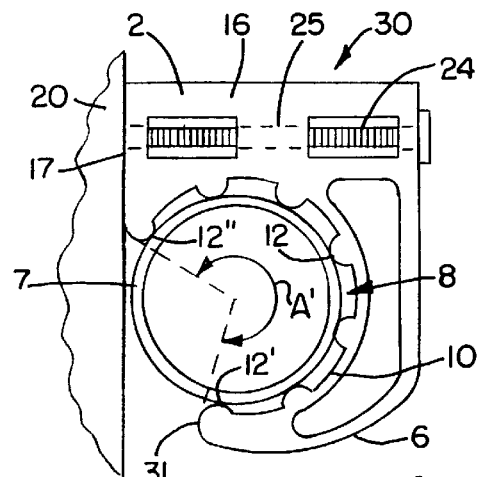
FIG. 6 is a side elevation view of the half clamp of FIG. 5 but showing a pipe snap fitted into the half clamp and the half clamp suitably fastened to a support surface.

FIGS. 5 and 6 show a half clamp 30 in accordance with this invention which is substantially identical in shape to the main body portion 2 of the full clamp 1 of the FIGS. 1 through 4 embodiment. The only difference is that the hinge 4 of the full clamp 1 is eliminated from the half clamp 30 by not providing a recess or groove 5 in the outer wall 6 of the clamp, and the projection 12' on the pivotable arm 3 that is immediately adjacent the hinge 4 of the full clamp 1 is incorporated as part of the half clamp 30 thus extending the recess 8 in the clamp 30 over an arcuate length A' of approximately 248 degrees. This has the advantage that the same mold that is used to mold the full clamp can also be used to mold the half clamp simply by removing an insert that is used to form the hinge 4 in the full clamp and by placing another insert in the mold to eliminate the portion of the arm 3 beyond the projection 12'.

To secure the half clamp 30 to a pipe 7, the pipe 7 is simply snap fitted into the recess 8 in the half clamp with the projections 12, 12' and 12" on the inner wall 10 of the recess 8 in gripping engagement with the exterior surface of the pipe as schematically shown in FIG. 6. Then the flat bottom surface 17 of the upstanding side 16 of the half clamp 30 (which extends below the pipe and the outer lowermost tip 31 of the clamp) is pressed up against a mounting surface 20 and the fastener 24 is driven completely through the hole 25 in the upstanding side 16 and into such mounting surface to secure the pipe in place.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A pipe clamp for supporting a pipe from a mounting surface comprising a plastic body portion having an upstanding side terminating in a flat bottom, and an arcuate recess in said body portion having an arcuate length at least approximately 230°, said body portion having opposite ends at opposite ends of said recess that are relatively thin and flexible for ease of snap fitting a pipe into said recess, and a plurality of circumferentially spaced, longitudinally extending plastic projections on an inner arcuate wall of said recess for gripping an exterior surface of the pipe when inserted in said recess, one of said projections being located at each end of said recess to aid in preventing the clamp from becoming loosened around the pipe when inserted in said recess.

2. The clamp of claim 1 wherein said recess has an arcuate length of between approximately 230° and 248°.

3. A pipe clamp for supporting a pipe from a mounting surface comprising a plastic body portion having an upstanding side terminating in a flat bottom, and an arcuate recess in said body portion having an arcuate length in excess of 180°, said body portion having opposite ends at opposite ends of said recess that are relatively thin and flexible for ease of snap fitting a pipe into said recess, a pivotable arm integrally connected to said body portion by a hinge formed by a notch in an outer wall of said body portion remote from said flat bottom, said arm being pivotable about said hinge away and toward said flat bottom for opening and closing said clamp around the pipe, said arm having an arcuate recess forming a continuation of said recess in said body portion when said arm is moved into engagement with said flat bottom, and a plurality of circumferentially spaced, longitudinally extending plastic projections on arcuate inner walls of said recesses in said body portion and said arm for gripping an exterior surface of the pipe when inserted in said clamp, one of said projections being located on said inner wall of said recess in said arm immediately adjacent said hinge to provide a well defined hinge line or flexure point between said arm and said body portion.

4. The clamp of claim 3 wherein said arm includes a flat bottom surface that extends substantially the full length of said arm to provide a relatively large surface area for supporting said clamp against a mounting surface.

5. The clamp of claim 4 wherein said arm includes a top surface that is substantially flat and parallel to said bottom surface, said top surface being engageable with said flat bottom of said body portion when said arm is pivoted into engagement with said body portion.

6. The clamp of claim 5 wherein said top surface of said arm intersects said inner wall of said recess in said arm at a point inwardly of an innermost edge of said flat bottom of said body portion to provide full mating contact between said flat bottom of said body portion and said top surface of said arm when said arm is pivoted into engagement with said body portion.

7. The clamp of claim 5 wherein an opening of approximately 7° is formed between said top surface of said arm and said bottom surface of said body portion when said clamp is in a fully relaxed condition prior to use.

8. A full pipe clamp for supporting a pipe from a mounting surface comprising a plastic body portion having an upstanding side terminating in a flat bottom and an arcuate recess in said body portion having an arcuate length in excess of 180°, and an arm integrally connected to said body portion by a hinge formed by a notch in an outer wall of said body portion remote from said flat bottom, said arm being pivotable about said hinge away and toward said flat bottom for opening and closing said clamp around a pipe, said arm having an arcuate recess forming a continuation of said recess in said body portion when said arm is moved into engagement with said flat bottom, and a plurality of circumferentially spaced, longitudinally extending plastic projections on arcuate inner walls of said recesses in said body portion and said arm for gripping an exterior surface of the pipe when inserted in said clamp, one of said projections being located on said inner wall of said recess in said arm immediately adjacent said hinge to provide a well defined hinge line or flexure point between said arm and said body portion.

9. The clamp of claim 8 wherein one end of said body portion remote from said hinge is formed by the intersection of said flat bottom with said inner wall of said recess in said body portion, and another one of said projections is located at said one end of said recess in said body portion to aid in preventing the clamp from becoming loosened around the pipe when inserted in said recess in said body portion.

10. The clamp of claim 8 wherein said arm includes a flat bottom surface extending substantially the full length of said arm for supporting said clamp against the mounting surface, and a top surface that is substantially flat and parallel to said bottom surface, said top surface being engageable with said flat bottom of said body portion when said arm is pivoted into engagement with said body portion.

11. The clamp of claim 8 wherein said recess in said body portion has an arcuate length of at least approximately 230° and said recess in said arm has an arcuate length of approximately 116°.

12. A pipe clamp for supporting a pipe from a mounting surface comprising a plastic body portion having an upstanding side terminating in a flat bottom, and an arcuate recess in said body portion having an arcuate length in excess of 180°, said body portion having opposite ends at opposite ends of said recess that are relatively thin and flexible for ease of snap fitting a pipe into said recess, one of said ends of said body portion being formed by the intersection of said flat bottom with an inner arcuate wall of said recess at an acute angle to increase the surface area of said flat bottom and provide a taper at one end to impart a greater flexibility to said one end, and a pivotable arm integrally connected to the other end of said body portion by a hinge formed by a notch in an outer wall of said body portion, said arm being pivotable about said hinge away and toward said flat bottom of said body portion for opening and closing said clamp around the pipe, said arm having an arcuate recess forming a continuation of said recess, in said body portion when said arm is moved into engagement with said flat bottom of said body portion.

13. A half clamp for supporting a pipe from a mounting surface comprising a plastic body portion having an upstanding side terminating in a flat bottom that is engageable with the mounting surface, and an arcuate recess in said body portion having an arcuate length of between approximately 230° and 248°, said body portion having opposite ends at opposite ends of said recess that are relatively thin and flexible to facilitate snap fitting of a pipe into said recess, one of said ends of said body portion being formed by the intersection of said flat bottom with an arcuate inner wall of said recess at an acute angle to increase the surface area of said flat bottom and provide a taper at said one end to impart greater flexibility to said one end, and the other end of said body portion being tapered inwardly toward said inner wall of said recess to impart greater flexibility to said other end, and a plurality of circumferentially spaced, longitudinally extending plastic projections on said inner wall of said recess for gripping an exterior surface of the pipe, one of said projections being located at each end of said recess to aid in preventing the clamp from becoming loosened around the pipe when the pipe is snap fitted into said recess.

\* \* \* \* \*